(12) United States Patent
Wang et al.

(10) Patent No.: US 7,743,490 B2
(45) Date of Patent: Jun. 29, 2010

(54) AUTO-ASSEMBLING SYSTEM FOR SMALL SHELL DEVICES

(75) Inventors: Shih Ming Wang, Taipei (TW); Ting Kuo Chen, Jhongli (TW)

(73) Assignee: Chung Yuan Christian University, Chung Li (TW)

( * ) Notice: Subject to any disclaimer, the term of this patent is extended or adjusted under 35 U.S.C. 154(b) by 748 days.

(21) Appl. No.: 11/232,053

(22) Filed: Sep. 21, 2005

(65) Prior Publication Data

US 2007/0074388 A1    Apr. 5, 2007

(51) Int. Cl.
*B23Q 5/00* (2006.01)
(52) U.S. Cl. .................................... 29/718; 361/679.01
(58) Field of Classification Search ................... 29/712, 29/771, 786, 718, 407.08; 361/679.01, 681
See application file for complete search history.

(56) References Cited

U.S. PATENT DOCUMENTS

| | | | | |
|---|---|---|---|---|
| 3,427,704 A | * | 2/1969 | Banke ......................... | 29/429 |
| 5,846,092 A | * | 12/1998 | Feldman et al. ............. | 439/76.1 |
| 5,979,034 A | * | 11/1999 | Higuchi et al. ............. | 29/407.01 |
| 6,787,696 B2 | * | 9/2004 | Liljevik et al. .............. | 174/371 |

* cited by examiner

*Primary Examiner*—Charles A Fox
(74) *Attorney, Agent, or Firm*—Bacon & Thomas, PLLC

(57) ABSTRACT

The present invention discloses an auto-assembling system for small shell devices. The system includes a first transportation apparatus, a second transportation apparatus, a first driving module, a second driving module, a power assembling module and a control circuit. The first transportation apparatus having a first transportation belt and the second transportation apparatus having a second transportation belt are used to transport the frames or the covers of the devices. The power assembling module mounted on the end of the first transportation apparatus and the second transportation apparatus is used for vertically pressing downwardly the frames and the covers such that the frames and the covers can be assembled.

21 Claims, 10 Drawing Sheets

AUTO-ASSEMBLING SYSTEM FOR SMALL SHELL DEVICES

FIELD OF THE INVENTION

The present invention relates to an auto-assembling system and, more particularly to an auto-assembling system for small and thin devices, which is used to auto-assemble and collect the assembling frames and covers of the small shell devices.

BACKGROUND OF THE INVENTION

Description of the Prior Art

Generally speaking, mobile phone components can be divided into four categories: active devices, passive devices, mechanism, and functional devices. In view of the mobile phone, the active devices (which can perform the power-on/off function) have three main component vendors: (1) IC (Integrated Circuit) related, such as Baseband IC or RF (Radio Frequency) IC, audio and video IC; (2) Panel; and (3) OLED (Organic Light-Emitting Diode). Passive devices include: resistors, capacitor (Multi-Layer Ceramic Capacitor, MLCC), inductor, antenna, filter, and oscillator. In Mechanism (performing the mechanical procedure is called mechanical devices) is not only provided smoothly, but also have the cooperation opportunities with international companies. Regarding the functional devices (which include batteries, electrical voice products and lens) these devices are more popular in markets where Taiwan has outstanding performance. Although the lens manufactures received attention during development of the digital still camera market, the outstanding performance of lens manufacturers will continue as the mobile phone camera replaces the digital still camera lens. However, the ramp-up of multimedia A/V mobile phones will increase the volume of hands-free phone sets.

Global mobile phone sales volume is very significant. A USA market research institute report of April 2004 estimated that global sales will be around 6 billion to 6.20 billion in volume in the year 2004. One of the market survey companies, iSuppli, predicted that global mobile phone sales volume will be 6.7 billion. Global mobile phone continued to grow through September 2004. Two analytic institutes, Gartner and IDC, re-predicted the sales volume from 6.2 billion and 5.96 billion up to 6.5 billion and 6.49 billion units. Therefore, according to the market analytic institutes Gartner and IDC, the predicted global mobile phone growth rate rises from the original 19.23% and 7.89% up to 25% and 20.56%. In the other words, mobile phone sales volume is much greater than the predicted volume in 2004. Moreover, the global mobile phone sales status in 2005, in view of the mobile phone users exchanged, new area market prediction, each research institute estimation and international mobile phone manufacturer's prediction indicate that global mobile phone sales will continue to increase, with a growth rate of about 5~10%.

Although Taiwan companies already have the manufacturing capability in those related industries, most of the market is still dominated by large international manufacturers. With the market for Taiwan consumer products growing, the mobile phone assembly industries are still an important market. With increases in mobile phone volume, the current number of employees should not be sufficient. In order to maintain the current number of employees and efficient productivity, the assembly technique needs to change from employee labor to automated assembly. The assembly flow becomes an automatic system allowing one employee to handle at least two assembly lines. Not only does this reduce the need for labor resources, but it also increases the assembly speed per unit.

So far, the Taiwan mobile phone market is growing, and the anti-magnetic devices requested is increasing daily. For the trend of future, the whole device process from manufacture, quality assurance and assembly needs to be combined with automatic transportation equipment to meet the requirements for mass production and reduce manufacture cost criterions. This automatic concept needs to match the current market strategy for reduced labor costs, shrinking the manufacture plant area, and avoiding the occurrence of a career damaging event.

However, it not only used a vacuum cup to inhale the anti-magnetic device in China mobile phone devices assembly manufacture, but also used the highly accurate mechanical arms to move in the air to make the downward pushing and assembly effect. Due to the mechanical arms need to obtain accurate 3D dimension control, the whole control system includes software and hardware equipment, plus vacuum inhale equipment which has a cost that is too expensive for the medium or small size enterprise to invest in.

The present invention provides an auto-assembling system to meet the criterions, more particularly, for the small shell devices auto-assembling to improve productivity and efficiency. It is able to use the auto-assembling system of the assembly lines to apply for different devices a certain production quantity, and to also solve the labor and high cost problems.

SUMMARY OF THE INVENTION

The present invention will be described more fully hereinafter with some practice embodiments. Moreover, attention should be paid not only to the full illustration, but also that this invention can be executed on a broad range embodiments. Furthermore, this invention is not limited by the embodiments herein described, but rather covers the full range of the claimed invention.

The present invention is directed to an auto-assembling system to assemble the frames and covers for small shell devices.

Another purpose of the present invention is to provide an auto-assembling system to combine the control circuit for control of the transportation and assembly of the frames and covers for assembling the small shell devices. The present invention can also collect the frames and covers composition more efficiently.

Another purpose of the present invention is to provide an auto-assembling system, not only to increase the frames and covers assembly yield rate, but to also reduce the equipment cost and improve productivity and efficiency.

The present invention is directed to an auto-assembling system for small shell devices, and includes the first transportation apparatus, the second transportation apparatus, the first driving module, the second driving module, the power assemble module and control circuit. Both the first and second transportation apparatus are used to transport the frames or covers, the first transportation apparatus has a first transportation belt, and the second transportation apparatus has a second transportation belt. The first transportation apparatus is mounted on the second transportation apparatus. The first driving module is mounted on the first transportation apparatus responsive to the first transportation apparatus for driving the frames or covers, which are transported by the first transportation apparatus to an assemble area along a slide path. The second driving module is mounted on the second transportation apparatus responsive to the second transportation apparatus for driving the frames or covers transported by the second transportation apparatus to an assembling section along a track, where the frames and covers are roughly matched. The power assemble module is connected on the end of the first transportation apparatus and the second transportation apparatus is responsive to the assembling section for vertically, downwardly pressing the frames and covers to assemble the matching frames and covers. The control circuit connects the first transportation apparatus, the second transportation apparatus, the first driving module, the second driving module and the power assemble module.

The present invention is directed to an auto-assembling system for small shell devices, and includes the power assemble module and control circuit to drive and assemble the frames and covers of the small shell devices to reach the automatic assemble effect. The auto-assembling system for small shell devices includes a slide path, a track, the first transportation apparatus, the second transportation apparatus, the first driving module, the second driving module, the power assemble module and control circuit. The track and slide path have left, right and inside handrails. The first transportation apparatus includes a first transportation belt for transporting the frame and cover of the device to a slide path. The second transportation apparatus includes a second transportation belt for transporting the frame and cover of the device to a track, wherein the first transportation apparatus is mounted on the second transportation apparatus. The first driving module drives the frames and covers which are transported by the first transportation apparatus to an assemble area along a slide path. The second driving module drives the frames or covers which are transported by the second transportation apparatus to an assembling section along a track, where the frames and covers are roughly matched), and the first transportation apparatus is mounted on the second transportation apparatus. The power assemble module is connected on the end of the first transportation apparatus and the second transportation apparatus is used to vertically press the frames and covers downwardly to assemble the matching frames and covers. The control circuit connects the first transportation apparatus, the second transportation apparatus, the first driving module, the second driving module and the power assemble module.

BRIEF DESCRIPTION OF THE DRAWINGS

Some of the purposes and advantages of the invention have been fully stated, others will be more fully understood by reference to the accompanying drawings, in which.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described herein, and the scope of the present invention is expressly not limited except as specified in the accompanying claims. Moreover, the components of the different elements are not shown to scale. Some dimensions of the related components are exaggerated and insignificant portions are not drawn in order to provide clearer description and comprehension of the present invention.

Figure 1:
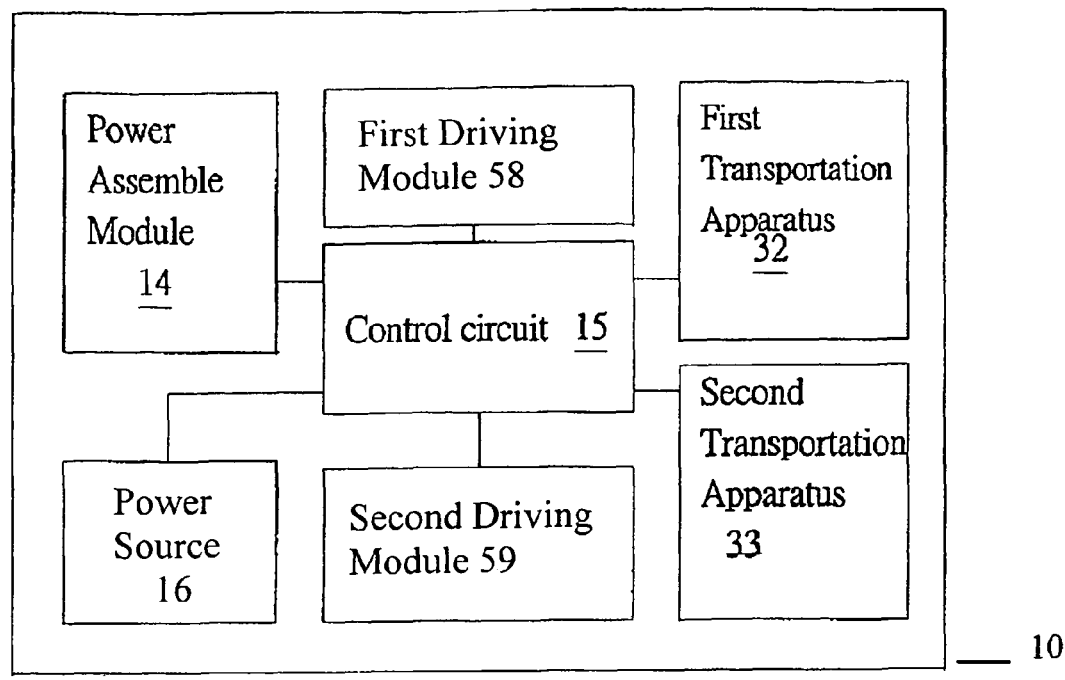
FIG. 1 is a functional block diagram illustrating the auto-assembling system of the small shell device, according to an illustrative embodiment of the present invention.

Referring now more particularly to the accompanying drawings, FIG. 1 shows a block diagram of the auto-assembling system for the small shell devices of the present invention. The auto-assembling system 10 itself comprises the first transportation apparatus 32, the second transportation apparatus 33, the first driving module 58, the second driving module 59, the power assemble module 14, the control circuit 15 and the power source 16. The first transportation apparatus 32 and the second transportation apparatus 33 are used to transport the frames or covers, wherein the first transportation apparatus 32 is mounted on the second transportation apparatus 33. The first driving module 58 drives the frames or covers, which are transported by the first transportation apparatus 32, to an assembling section 12 along a slide way or path 11 (see FIG. 2). The second driving module 59 drives the frames and covers, which are transported by the second transportation apparatus 33, to an assembling section 12 along a track 18, where the frames and covers are roughly matched (see FIG. 2). The power assemble module 14 connected on the end of the first transportation apparatus and the second transportation apparatus is used to vertically press downwardly the frames and covers to assemble the matching frames and covers. The control circuit 15 connects the first transportation apparatus 32, the second transportation apparatus 33, the first driving module 58, the second driving module 59 and the power assemble 14. In one embodiment, the auto-assembling system 10 includes a power source 16, which is connected to control circuit 15.

Figure 2:
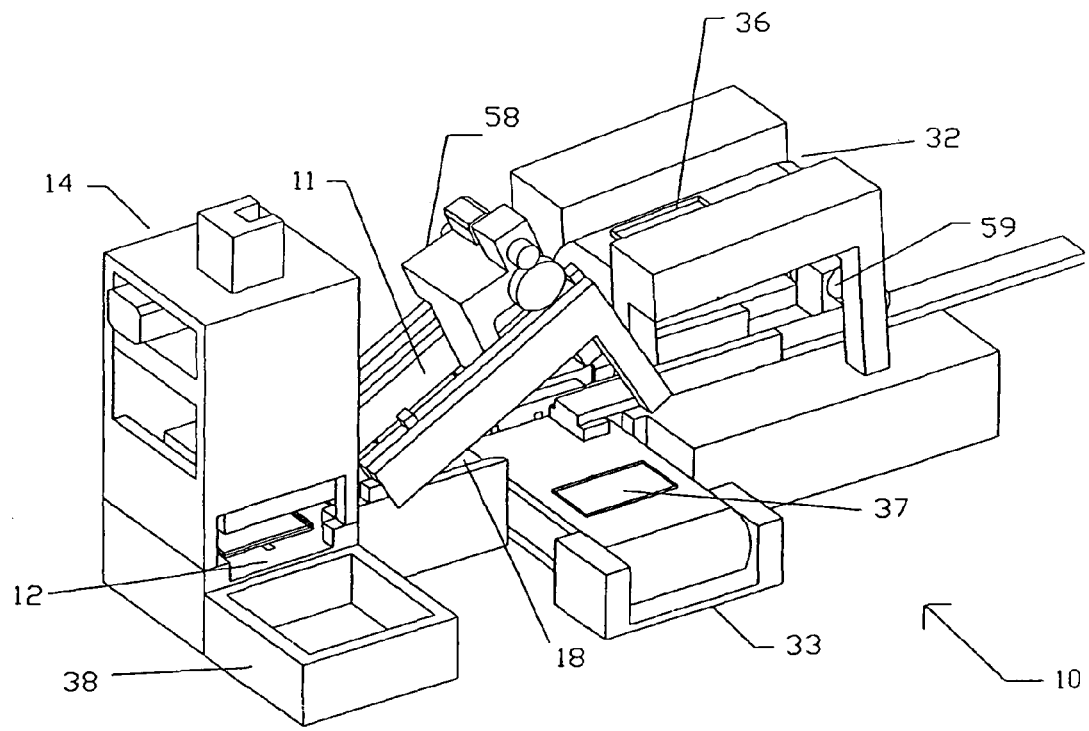
FIG. 2 is a perspective view illustrating the architecture of the auto-assembling system of small shell device, according to an illustrative embodiment of the present invention.
Figure 3:
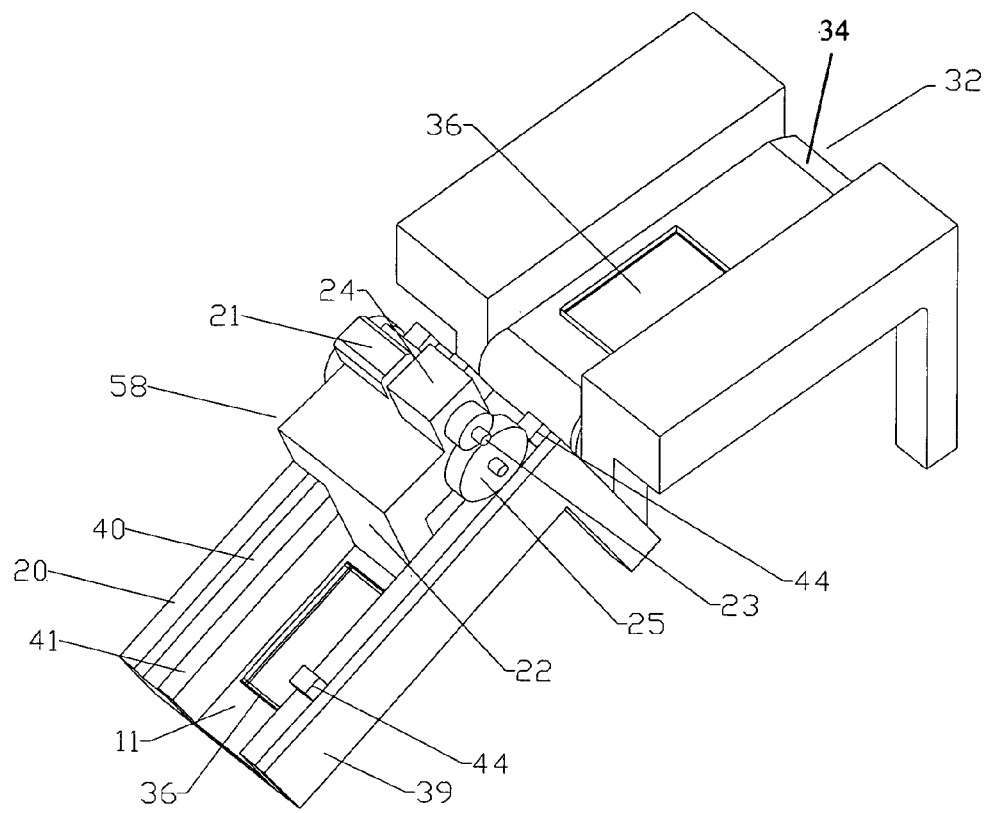
FIG. 3 is a perspective view illustrating the first transportation apparatus to transport the frames to the slide path, according to an illustrative embodiment of the present invention.
Figure 4:
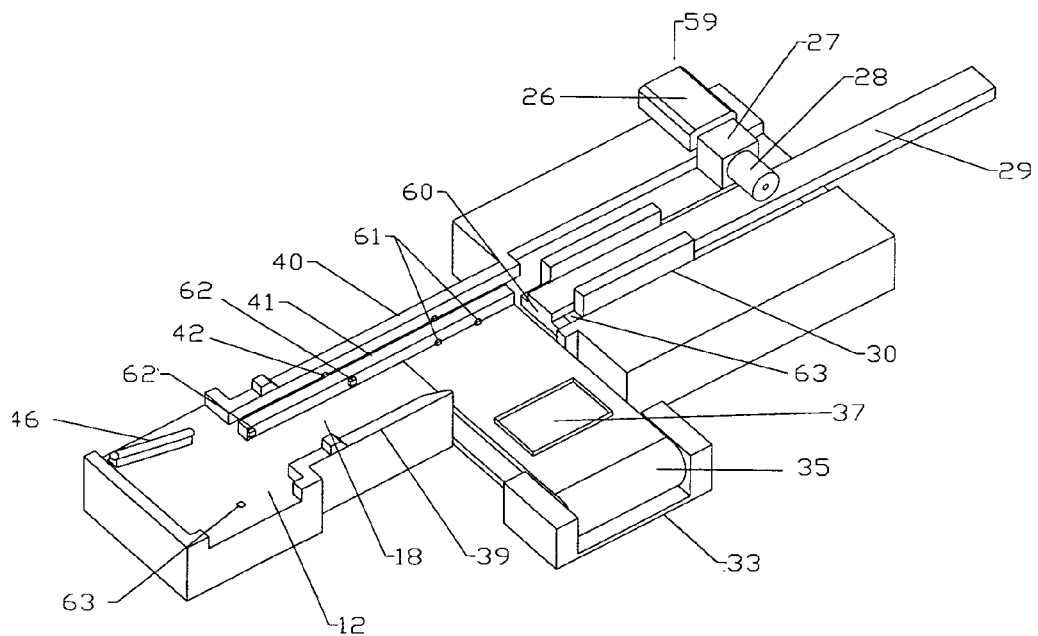
FIG. 4 is a perspective view illustrating the second transportation apparatus to transport the covers to the track, according to an illustrative embodiment of the present invention.

Referring now to FIGS. 2-4, where FIG. 2 shows the architecture of the auto-assembling system 10 of FIG. 1, the auto-assembling system 10 comprising a slide path 11, a track 18, the first transportation apparatus 32, the second transportation apparatus 33, the first driving module 58, the second driving module 59, the power assemble module 14 and control circuit 15. Both the slide path 11 and the track 18 have a left handrail 40, right handrail 39 and inside handrail 41 (see FIGS. 3 and 4). The first transportation apparatus 32 and the second transportation apparatus 33 transport frames 36 and covers 37 of the devices to an assembling section 12 (see FIG. 4), wherein the first transportation apparatus 32 is mounted on the second transportation apparatus 33. The first driving module 58 drives the frames 36 or covers 37, which are transported by the first transportation apparatus 32, to an assembling section 12 along a slide path 11 (see FIG. 2). The second driving module 59 drives the frames 36 or covers 37, which are transported by the second transportation apparatus 33, to an assembling section 12 along a track 18 (see FIG. 4), where the frames 36 and covers 37 roughly engage with each other. The power assemble module 14 vertically, downwardly presses the frames 36 and covers 37 to assemble the matching frames 36 and covers 37. The control circuit 15 is connected with the first transportation apparatus 32, the second transportation apparatus 33, the first driving module 58, the second driving module 59 and the power assemble module 14. In one embodiment, the auto-assembling system 10 includes a power source 16, which also connects to the control circuit 15.

Referring now to FIG. 3, the first transportation apparatus 32 includes the first transportation belt 34, which transports the frames 36 or covers 37 to the slide path 11. First transportation belt 34 also activates the first driving module 58 to drive the frames 36 or covers 37 along the slide path 11.

FIG. 3 shows the first driving module 58 that includes first motor 21, first decelerated apparatus 24, a transmission shaft 23, first gear 25 and the first rack 20. The first motor 21 connects to the first decelerated apparatus 24, the first decelerated apparatus 24 connects to the first gear 25 over the transmission shaft 23 and then, the first gear 25 connects to the first rack 20.

In one embodiment, the first driving module 58 includes the first small type high speed motor 21, the speed of the first motor 21 may be reduced by the first decelerated apparatus 24, the first decelerated apparatus 24 is connected to the first gear 25 (one of each at left and right side) by the transmission shaft 23, and the first gear 25 connects the first rack 20 of the left handrail 40 and right handrail 39 which is assembled in the slide path 11, and then, the first driving module 58 turns the motion of the first gear 25 from the orbital motion into a straight-line motion to drive the first driving module 50 moving back and forth. Therefore, the first decelerated apparatus 24 is incorporated to prevent the first motor 21 from being over-speed to deliver the frames 36 or covers 37 to the right position. Further, switch sensors 63 can be adapted between two sides of the first rack 20 for detecting the back and forth motion range of the first driving module 58.

In another embodiment, the first driving module 58 connects with a block 22. For example, the first driving module 58 drives the block 22, which makes the first driving module 58 stays close on the surface of slide path 11 because of gravity. It can also deliver the frames 36 or covers 37 along the slide path 11 and make sure to drive the frames 36 or covers 37 to the right position. After that, the first driving module 58 will return to the original position. The first driving module 58 may be set to repeat the back and forth motion to deliver the frames 36 or covers 37.

FIG. 3 shows that the slide path 11 has handrails attached on two sides, wherein the handrails include right handrail 39, left handrail 40 and inner handrail 41.

In one embodiment, the auto-assembling system 10 includes sensors 44, which are used to detect each apparatus motion range of the system. For example, sensors 44 include the metal conductive sensor 61, the switch sensor 62 and photo interrupter sensor 63.

In another embodiment, the switch sensor 62 and photo interrupter sensor 63 are located in the two sides of the first rack 20 on the right handrail 39 of the slide path 11. The switch sensor 62 is a contact type; and the photo interrupter sensor 63 is a contact-less type, which is able to drive the first driving module 58 to the predetermined position.

Referring to FIG. 4, the second transportation apparatus 33 includes the second transportation belt 35. The second transportation apparatus 33 is used to deliver the frames 36 or covers 37 to the track 18 by the transportation belt 35, and the second transportation apparatus 33 can also drive the frames 36 or covers 37 along the track 18 when the second driving module 59 is actuated.

With reference to FIG. 4, the second driving module 59 includes second motor 26, second decelerated apparatus 27, second gear 28, second rack 29 and driving sticker 60. The second motor 26 connects to the second decelerated apparatus 27. The second decelerated apparatus 27 is connected to the second gear 28, and the second gear 28 connects to the second rack 29. The rack holder 30 includes the second rack 29 that connects to the driving sticker 60.

In one embodiment, the second driving module 59 is used to push the driving sticker 60 to deliver the frames 36 or covers 37 to the track 18 by the second transportation apparatus 33, which causes the frames 36 and covers 37 to roughly engage. Subsequently, the engaged frames 36 and covers 37 are delivered into the assembling section 12. Right after that, the driving sticker 60 will return to the original position, and it can also deliver the frames 36 or covers 37 by a back-and-forth motion.

The operation principle of the second driving module 59 is described below in connection with another embodiment. The second motor 26 connects to the gear and the second decelerated apparatus 27, the output transmission shaft of the second decelerated apparatus 27 connects to the second gear 28, the second gear 28 actuates the second rack 29, and the second rack 29 connects to the driving sticker 60. The second driving module 59 turns the motion of the second gear 28 from an orbital motion into a straight-line motion, so as to make the driving sticker 60 deliver the frames 36 or covers 37 by a back-and-forth motion. A photo interrupter sensor 62 (contact-less type sensor) can be installed on the side of the second rack 29 for reaching the accurate coordinate. For example, the auto-assembling system 10 is able to replace the different length of the driving sticker 60 to match the various types of frames 36 or covers 37 which have different length requirements.

FIG. 4 shows that the track 18 has the right handrail 39, left handrail 40 and inner handrail 40. In one embodiment, the inside handrail 40 has two sensors with a metal conductivity sensor 61 and two photo interrupter sensors 62. The metal conductive sensor 61 is a contact type sensor, which is used to control the actuation of the second driving module 59.

In another embodiment, while the second transportation apparatus 33 delivers the frames 36 or covers 37 to the track 18, it will actuate the second driving module 59 due to activation of the metal conductive sensor 61. The second driving module 59 uses the second motor 26, the second decelerated apparatus 27, the second gear 28, the second rack 29, and the driving sticker 60 to push the frames 36 or covers 37 to move left. In other words, it changes the frames 36 or covers 37 from the original direction to a 90 degree angle to make the frames 36 and covers 37 roughly match, and push the matching frames 36 and covers 37 into an assembling section 12 along the track 18. After that, the driving sticker 60 will return to the original position and it can also move back and forth to push the frames 36 or covers 37.

Figure 5:
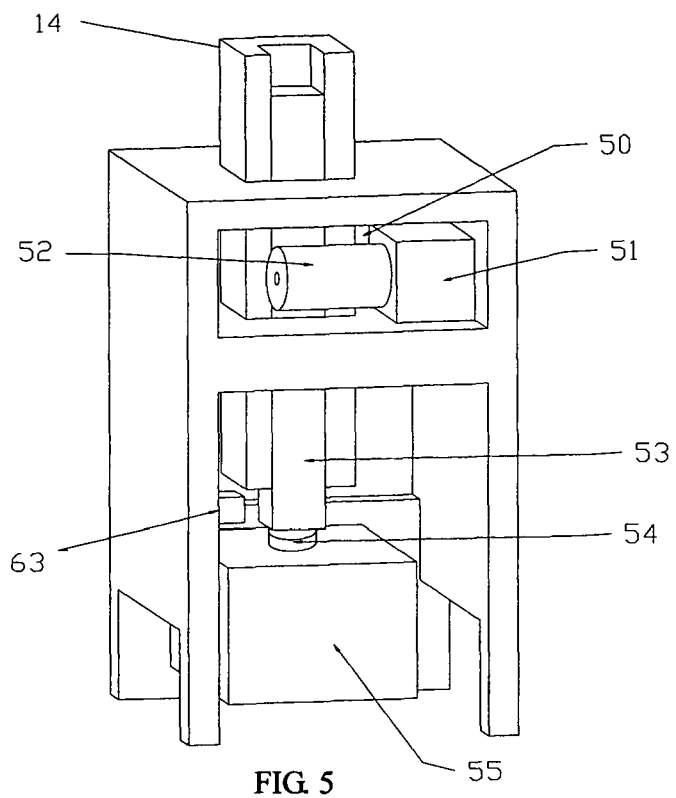
FIG. 5 is a perspective view illustrating the power assemble module, according to an illustrative embodiment of the present invention.

Referring to FIG. 5, the power assemble module 14 includes third motor 50, third decelerated apparatus 51, third gear 52 and third rack 53, which are configured inside a holder. The third motor 50 connects to the third decelerated apparatus 51, then the third decelerated apparatus 51 connects to the third gear 52, followed by connection of the third gear 52 to the third rack 53.

In one embodiment, the third rack 53 is connected to a joint 54, wherein the joint 54 is connected to a pressing cubic mold 55. For example, the joint 54 is a circle joint which is used to adjust the range of rotation to reduce assembly errors during the power assemble module 14 pressing downwardly to cause the unbalance of pressure on the frames 36 or covers 37. Between the pressing cubic mold 55 and the third rack 53, it forms a free degree by the spherical joint 54, which can reduce assembly errors from each direction during assembling of the frames 36 and covers 37.

In another embodiment, when the frames 36 or covers 37 pass the photo interrupter sensor 62 on the inner handrail 40 of the track 18, the power assemble module 14 will start. For example, the power assemble module 14 drives the pressing cubic mold 55 and presses downwardly the matching frames 36 and covers 37 in the assembling section 12 for assembling the frames 36 and covers 37, and then, the third rack 53 will drive the pressing cubic mold 55 back to its original position.

For example, the third motor 50 employs the third decelerated apparatus 51 to reduce the speed, and the output port of the third decelerated apparatus 51 connects the third gear 52. The third gear 52 is next connected to the third rack 53. The third rack 53 is constrained by the rack holder 49 such that the third gear 52 can only move up and down. The spherical joint 54 that connects to the third rack 53 and the pressing cubic mold 55 can provide the free degree of spinning for both of the elements 53 and 55. The power assemble module 14 includes a switch sensor 63 (contact type sensor) to detect the motion range of the third rack 53, which can control the up and down motion range of the pressing cubic mold 55.

According to the motor power (P), angle velocity ($\omega$), and torque (T), the relationship thereof can be expressed as $T=P/\omega$; the power unit is watt (W), or N*m/s, the angle velocity unit is rad/s, while the torque is N*m. In one embodiment, the principle of third decelerated apparatus 51 is used to decelerate the third motor 50 with high rotating speed through the arrangement of a gear set (for example: spur gear, worm, worm gear, star gear). Namely, the torque of the output may be increased compared to the input (the third motor 50 rotating in high speed) through proper ratio of decelerating (for example, if the rotating speed is reduced to $\frac{1}{100}$ of the original rotating speed while the torque will be raised to 100 times the torque corresponding to the original rotating speed). Therefore, the third decelerating apparatus 51 can control the pressure applied by the pressing cubic mold 55 using the linear relation between the rotating speed and the torque, thereby prevent the third motor 50 from operating at an excess speed to impact the frames 36 and the covers 37.

For example, the power source of the pressing cubic mold 55 is provided by a third motor 50 of a high-speed small type. The third decelerated apparatus 51 is used to decelerate the third motor 50, and the torque (twisted force) is amplified at the same time. The output shaft of the third decelerated apparatus 51 connects to the third gear 52, while the third gear 52 connects to the third rack 53. In the embodiment, the third rack 53 is connected to the pressing cubic mold 55 through the spherical joint 54. In spite of the wear (such as friction) during the transportation process, the pressing cubic mold 55 can receive the final output torque.

Figure 6:
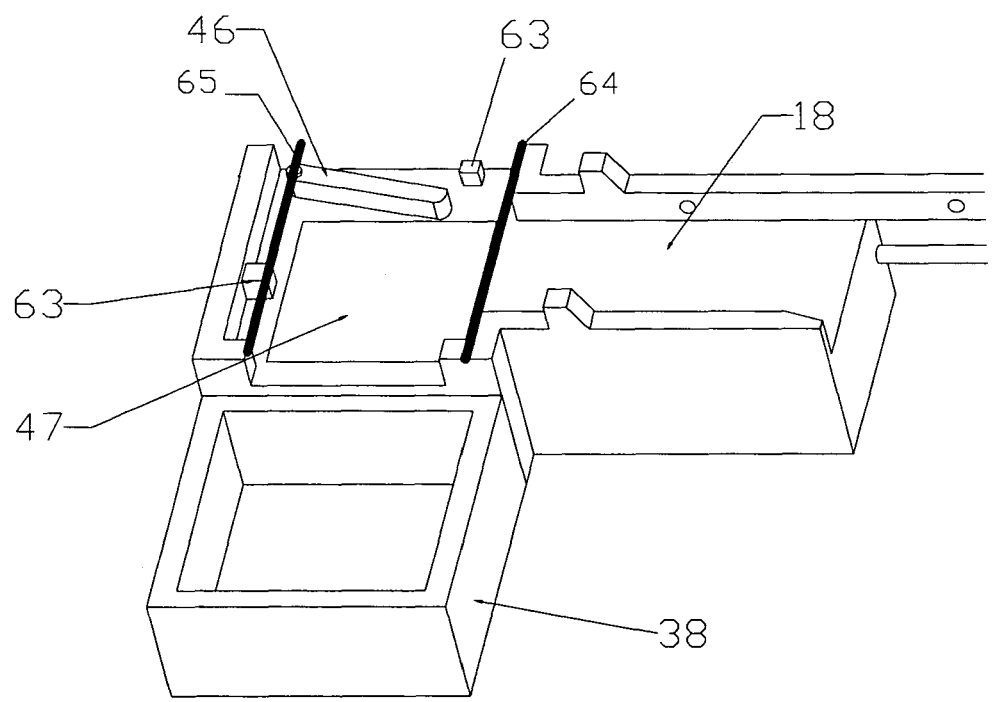
FIG. 6 is a perspective view illustrating a stick in the assembling section to turn the component of the frame and cover into the collecting plate, according to an illustrative embodiment of the present invention.

Referring to FIG. 6, the auto-assembling system 10 for small shell devices includes first stop line 64 and second stop line 65 which are respectively located in the right end and left end of assembling section 12. In one embodiment, when the frames 36 and covers 37 are pushed to the first stop line 64 of left end separately, the frames 36 and covers 37 will be approximately combined. When the driving sticker 60 pushes the frames 36 and covers 37 to the second stop line 65 on the right end of the assembling section 12, the driving sticker 60 pushes the matching frames 36 and cover 37 into the assembling section 12.

As shown in FIG. 6, the auto-assembling system 10 for small shell devices further comprises a collecting plate 38 that connects to assembling section 12. In one embodiment, the auto-assembling system 10 further comprises a stirring sticker 46, locating on the assembling section 12, for stirring the combination of frames 36 and covers 37 to the collecting plate 38, and collecting the combinations of frames 36 and covers 37. In another embodiment, the auto-assembling system 10 further comprises a soft pad 47. For example, the soft pad 47 is a soft plastic pad for absorbing the vibration and for buffering when the pressing cubic mold 55 is driven, downwardly. The soft pad 47 provides the property of elastic elevation, which can be adapted to each size of the frames 36 and covers 37. Thus, the influence of size difference among different frames 36 and covers 37 can be reduced when co-operating with the pressing cubic mold 55.

In one embodiment, the auto-assembling system 10 for small shell devices includes a switch sensor 63 located inside of an assembling section 12 for enabling the stirring sticker 46, and stirring the combination of the frames 36 and covers 37 into collecting plate 38. Then, the stirring sticker 46 returns to the original location.

As shown in FIG. 6, the auto-assembling system 10 for small shell devices further comprises the first stop line 64 and the second stop line 65 located separately on the left and right end of the assembling section 12, as will be described in detail below.

Figure 7:
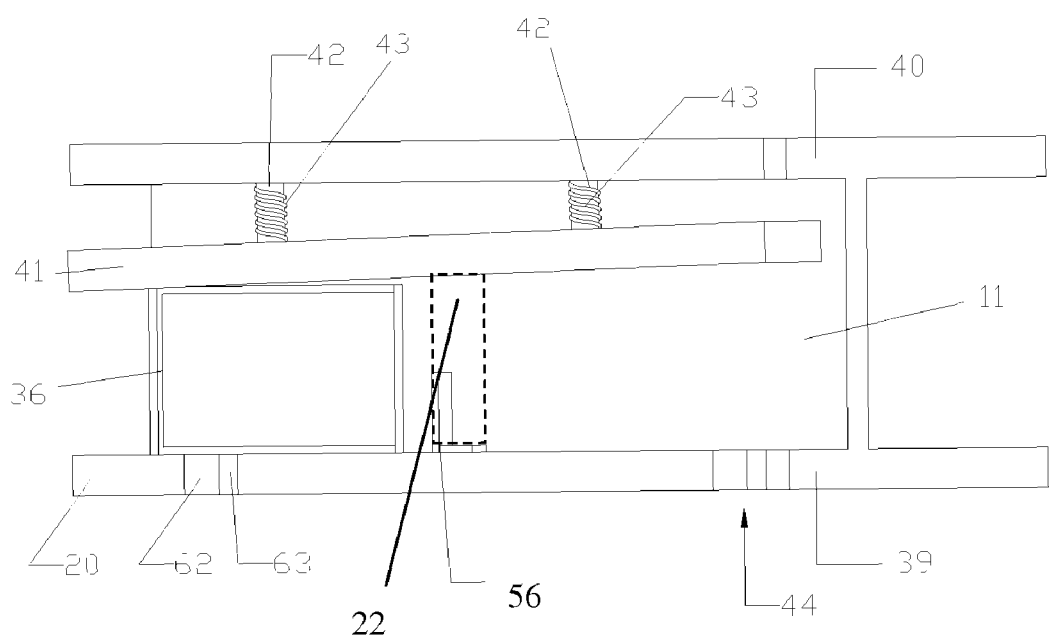
FIG. 7 is a cross-sectional view illustrating the adjustable width of the slide path, according to an illustrative embodiment of the present invention.

Referring to FIG. 7, the slide path 11 and track 18 include the right handrail 39, left handrail 40 and inside handrail 41. As shown in FIG. 7, inside handrail 41 connects through left handrail 40 by spiral shaft 42, spring 43 and screw cap passing through and connecting left handrail 40. For example, the spiral shaft 42 is a fine-pitch shaft, and a fine-pitch spiral shaft 42 must co-operate with two fine-pitch screw cap, for fixing inside handrail 41.

In one embodiment, when the spiral shaft 42 connecting the left handrail 40 and the inside handrail 41 is rotated, it can change the width between inside handrail 41 and the right handrail 39 for roughly adjusting, and covering the spring 43 on the spiral shaft 42 for buffering adjustment, to adapt to transporting the frames 36 and covers 37 of different types and sizes.

In another embodiment, spring 43 is a compressible spring, passing through the spiral shaft 42. When the frames 36 and covers 37 slightly slide into slide path 11 or track 18, they can be adjusted in real time by compressing spring 43, for decreasing the friction of the forward motion of frames 36 and covers 37. For example, when the mismatch of sizes of frames 36 and covers 37 are greater than a standard value, the compressing degree of spring 43 is higher, and when the errors of sizes of frames 36 and covers 37 are less than a standard value, the compressing degree is lower.

In another embodiment, the auto-assembling system 10 for small shell devices includes a micrometer caliper (micrometer) located inside of left handrail 40 of slide path 11. For example, the micrometer connects left handrail 40 by using the output shaft, when the scale turntable is rotated, the width of slide path 11 will be changed for fine tuning. In other words, the micrometer caliper can also be used for adjusting the width of the track 18.

For example, the position accuracy and measuring accuracy of a general micrometer caliper is 0.02 mm (50 sections per circular, proceed 1 mm for every circle, so the accuracy=1 mm/50=0.02 mm). Therefore, when the output shaft of the micrometer caliper locates outside the left handrail 40 that connects to inside handrail 41, the rotating-scale plate will be rotated for fine-tuning the width of the slide path 11 and track 18, to enhance the accuracy of positioning.

In one embodiment, the inside handrail 41 of the slide path 11 may adjust the width of the slide path 11 by a spiral shaft 42, spring 43 and screw cap, and may adjust the width of slide path 11 or change slide path 11 or track 18 to be wider in the top portion and narrower in the bottom portion. On the other hand, the opening of input frames 36 or covers 37 are wider, and the output opening is smaller, thereby constructing a shape of V-shape, which may help the frames 36 or covers 37 to slide into the slide path 11 or track 18. In another embodiment, the narrower width of the output can decrease the sliding-down acceleration of frames 36 and covers 37, and avoid excess speed during sliding down and not reaching the predicted place.

For example, when frames 36 and covers 37 match at a first step, the constrained effect may be induced by inside handrail 41 and right handrail 39. On the other hand, when the frames 36 slide into slide path 11, the left side and right side (in y-axis direction) are constrained by inside handrail 41 and right handrail 39, and covers 37 are constrained in the same way in track 18. In one embodiment, aligning the y-axis of slide path 11 and track 18 makes sure that the frames 36 and covers 37 are combined at the first step.

As shown in FIG. 7, the auto-assembling system 10 for small shell devices further comprises a horizontal shaft 56 located inside of right handrail 39 of the slide path 11. In one embodiment, when the first driving module 58 stops, the block 22 stops above the horizontal shaft 56. On the other hand, block 22 does not contact with the surface of the slide path 11 for allowing the frames 36 and covers 37 passing by one at a time smoothly, and the block 22 separates the former frames 36 or covers 37 sliding into slide path 11 to avoid two or more frames 36 or covers 37 sliding into slide path 11 at the same time because of stacking. When the first driving module 58 is powered on, the block 22 leaves the position of horizontal shaft 56, and stays closely on the surface of the slide path 11 to push the frames 36 or covers 37 along slide path 11.

Figure 8:
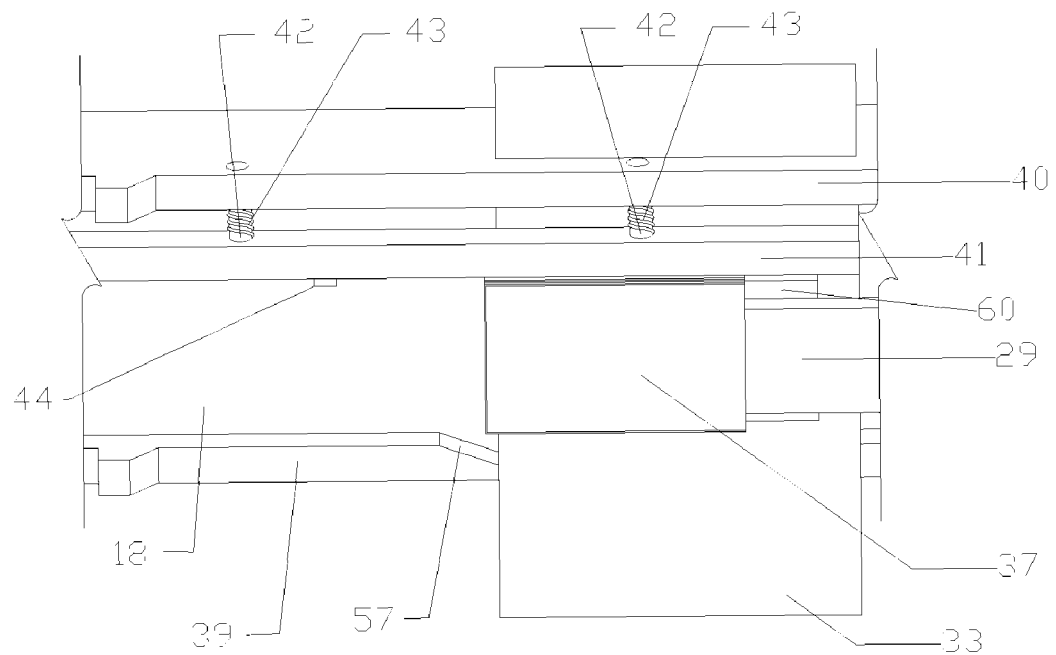
FIG. 8 is a cross-sectional view illustrating the track having a bevel edge to connect the second transportation apparatus, according to an illustrative embodiment of the present invention.

Referring to FIG. 8 the right handrail 39 of track 18 includes a bevel edge 57, for easily driving frames 36 or covers 37 from the second transportation apparatus 33 to track 18.

Figure 9:
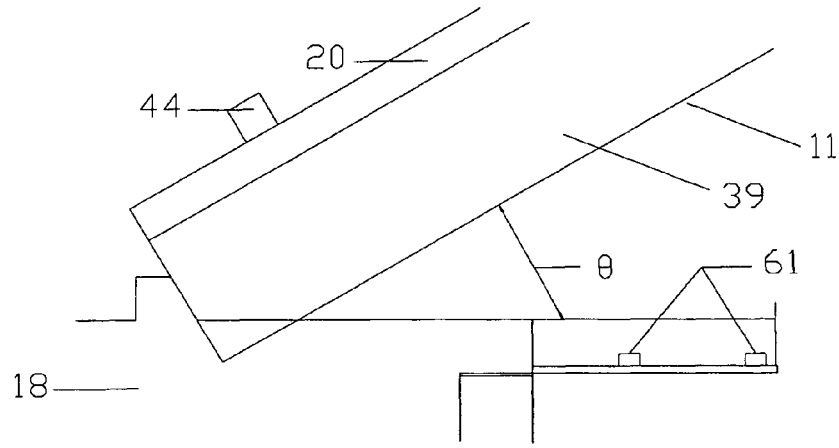
FIG. 9 is a cross-sectional view illustrating a slide path having a bevel edge to connect the track, according to an illustrative embodiment of the present invention.

Referring to FIG. 9, slide path 11 connects the track 18 with a tilting angle. In one embodiment, the preferred angle of the tilting angle θ is between 30 to 50 degrees, to avoid the unstable condition when the front edge of frames 36 or covers 37 are pushed over ⅓ to ½ of the slide path 11. In another embodiment, when the tilting angle is greater (over 50 degrees), the frames 36 or covers 37 slide down faster, and cause vibration and easily bounce; and when the tilting angle is smaller (less than 30 degrees), the frames 36 or covers 37 slide down with a slower speed. Improper alignment of the frames 36 or covers 37 causes a combination error.

In another embodiment, the auto-assembling system 10 for small shell can change the height of holder of slide path 11 to change the tilting angle. For a different tilting angle, the first driving module 58 can change the width and longitude of block 22 to maintain the center of gravity of the first driving module 58 within the auto-assembling system 10. For example, when the tilting angles is increased, the longitude of block 22 needs to be longer, so that the center of gravity of the first driving module 58 falls behind the first driving module 58; when the widths of the frames 36 or covers 37 are narrower, the widths of the block 22 should also be decreased (less than the widths of frames 36 and covers 37), then block 22 can be placed inside the slide path 11.

In one embodiment, control circuit 15 includes a microprocessor 8051 for process control. For example, a single-chip microprocessor 8051 arranges with resistors, capacitors, conductors, oscillators, LED lights, serial ports, relays, invertors and sensors.

In an embodiment, the auto-assembling system 10 for small shell devices does not use high class non-contact sensors (for example, lasers or infrared sensors), and does not use expensive electric controlled device such as: data acquisition card or PLC controller, because the cost of maintaining these expensive devices is higher than a self-manufactured electrical circuit. In one embodiment, the circuit is arranged mainly not to interfere with the function of auto-assembling system 10, and by using the open space of the apparatus, the circuits are pulled to the outside to connect the circuit board through a spiral hole, and without bothering the motion of parts. Therefore, sensors (for example: sensor types, or adjusting size error in real time) are contact-type sensors to decrease the manufacturing costs and increase the convenience in maintaining the devices.

According to the present invention, the control circuit 14 is applied to control the first transporting apparatus 32 to transport frames 36 and to control the second transporting apparatus 33 to transport covers 37. The first transporting apparatus 32 and the second transporting apparatus 33 can be controlled to enable or stop, periodically, for every frame 36 and every cover 37 to slide into slide path 11 and track 18, thus avoiding driving more than two frames 36 and covers 37 and disordering the sequence.

Figure 10:
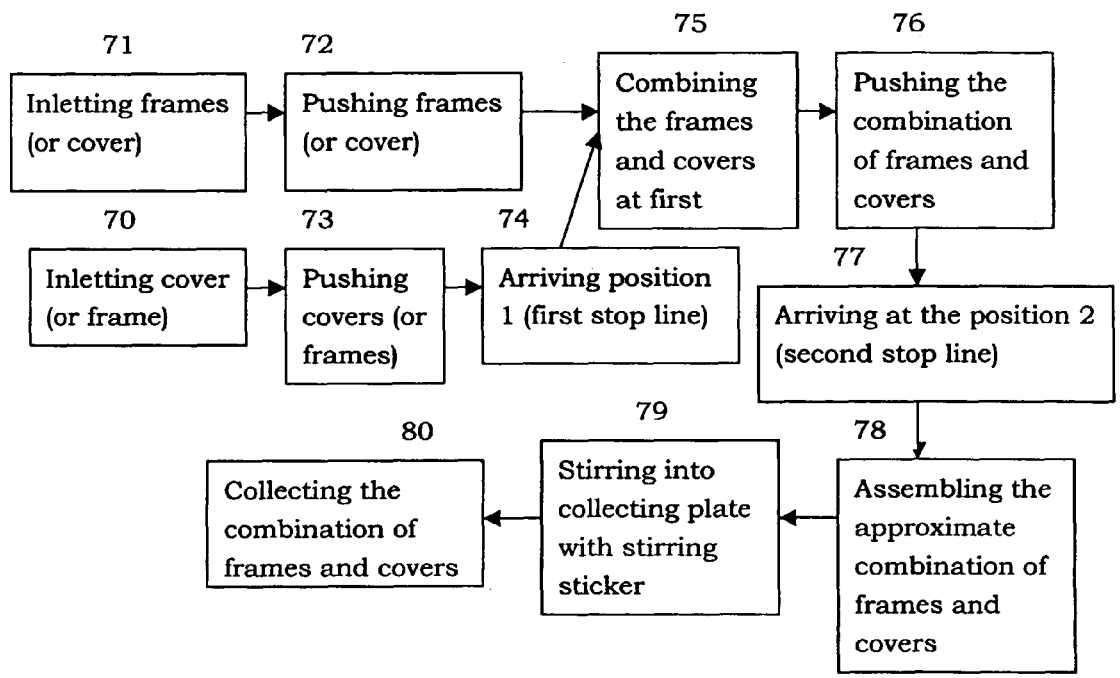
FIG. 10 is a flow chart of the operation of the auto-assembling system of the small shell devices, according to an illustrative embodiment of the present invention.
Figure 10A:
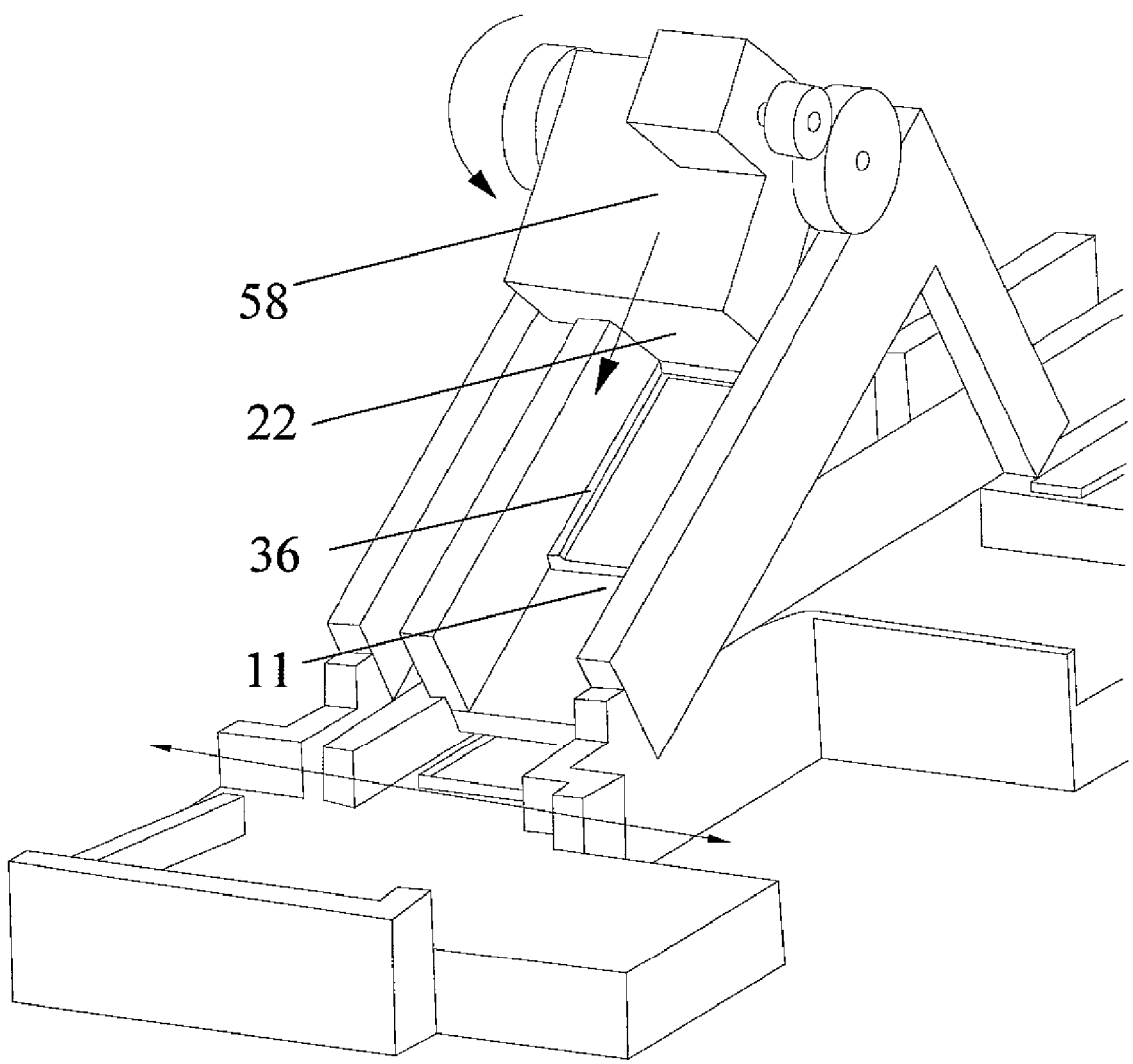
Figure 10B:
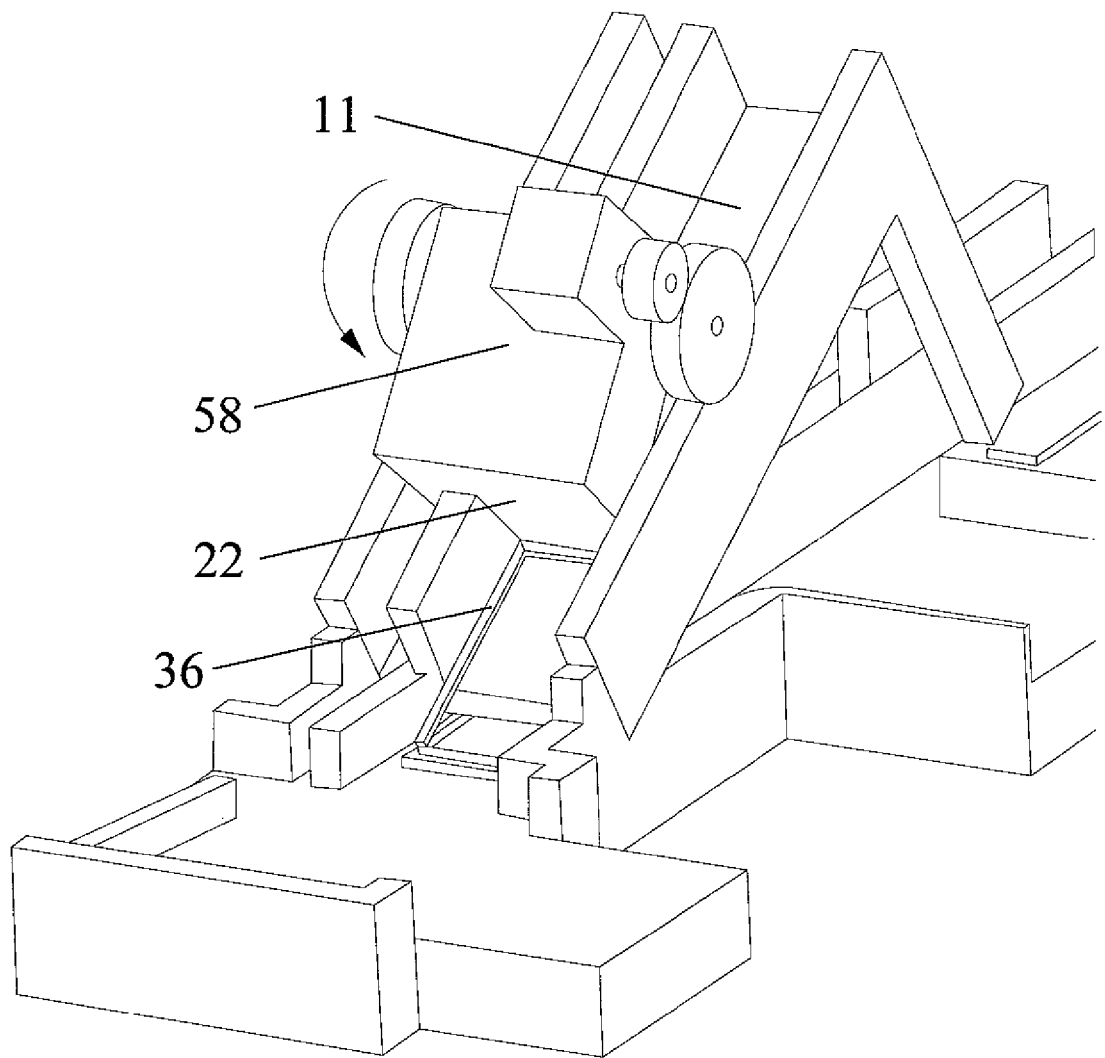
Figure 10C:
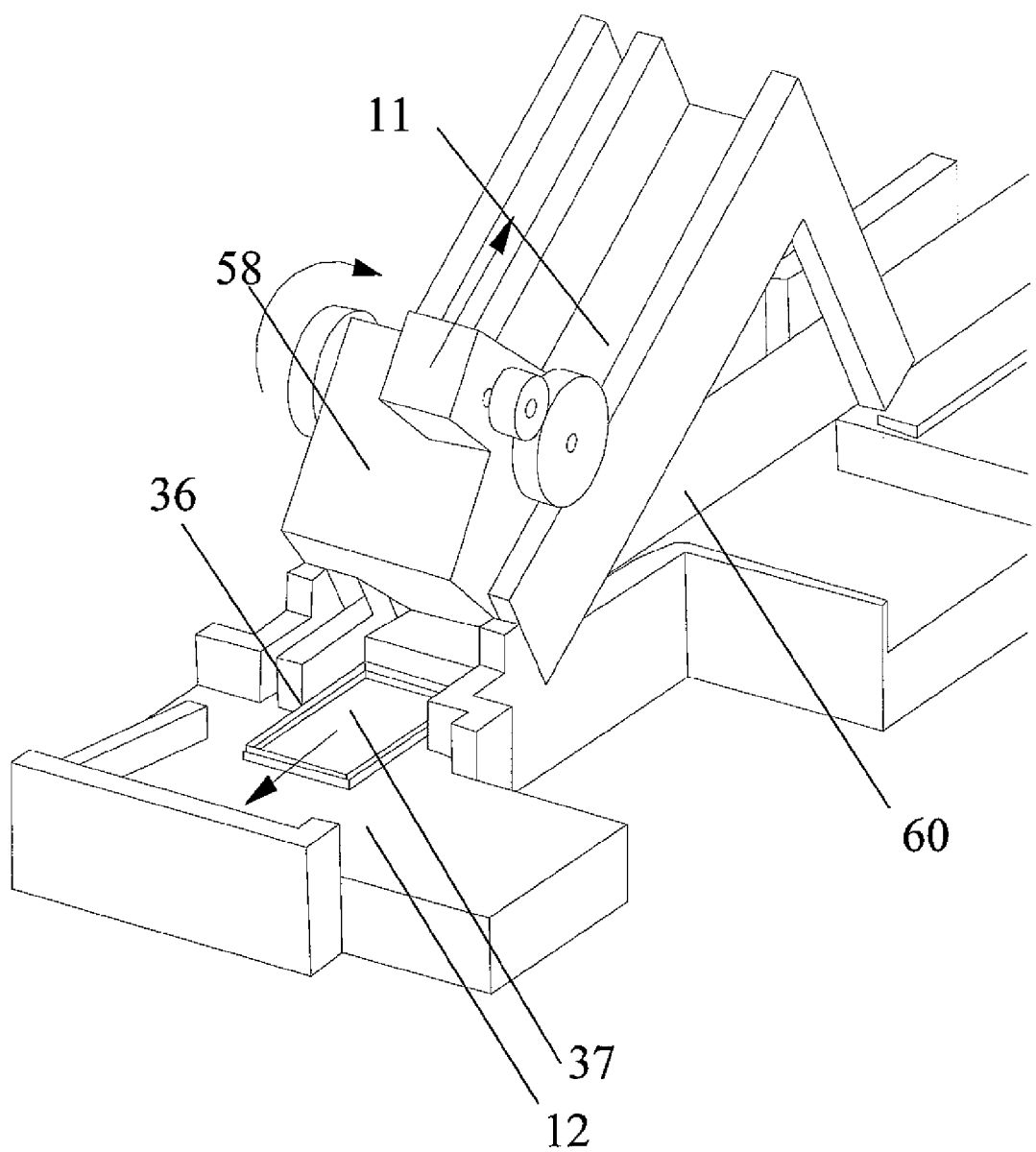
Figure 10D:
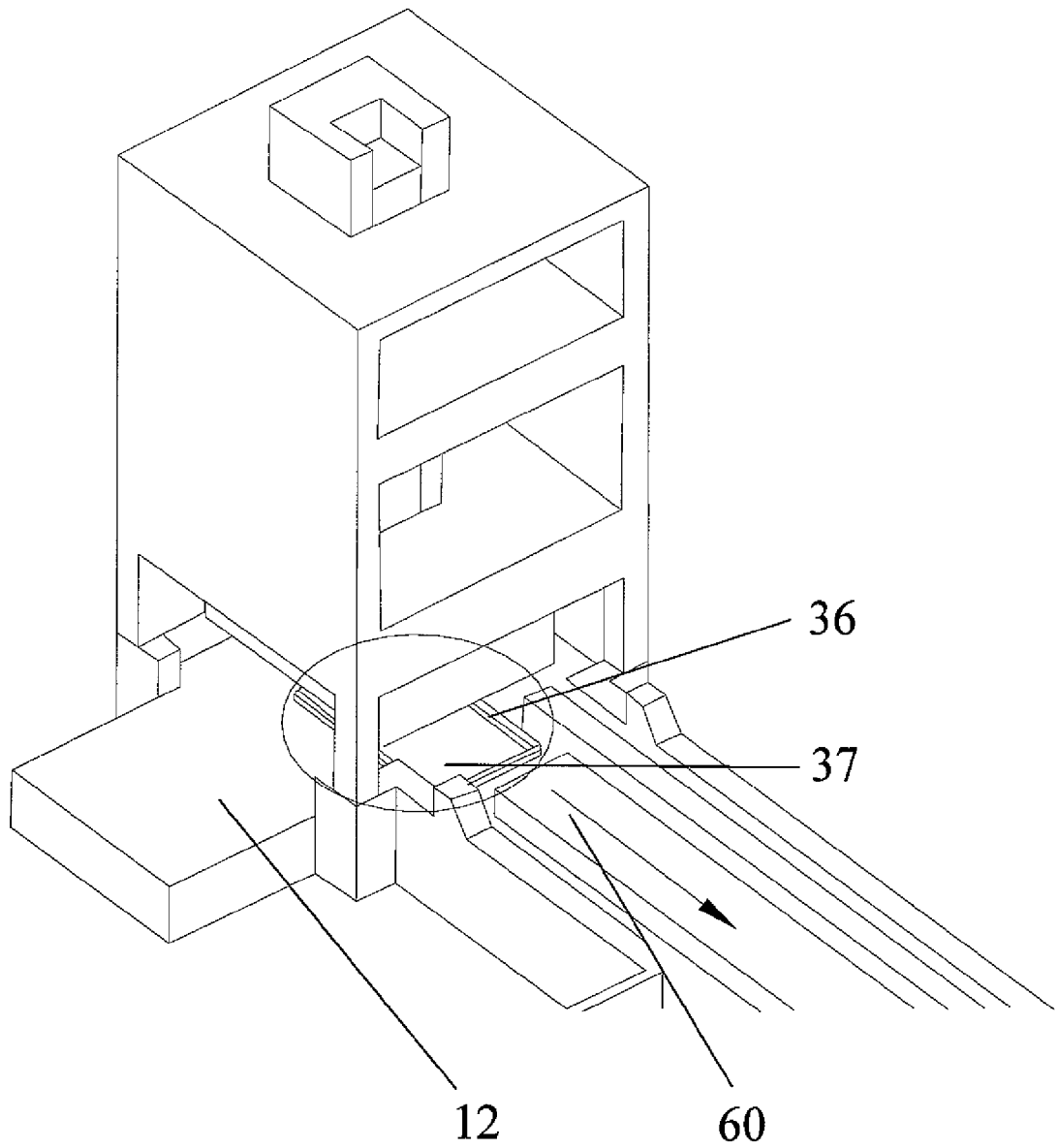
Figure 10E:
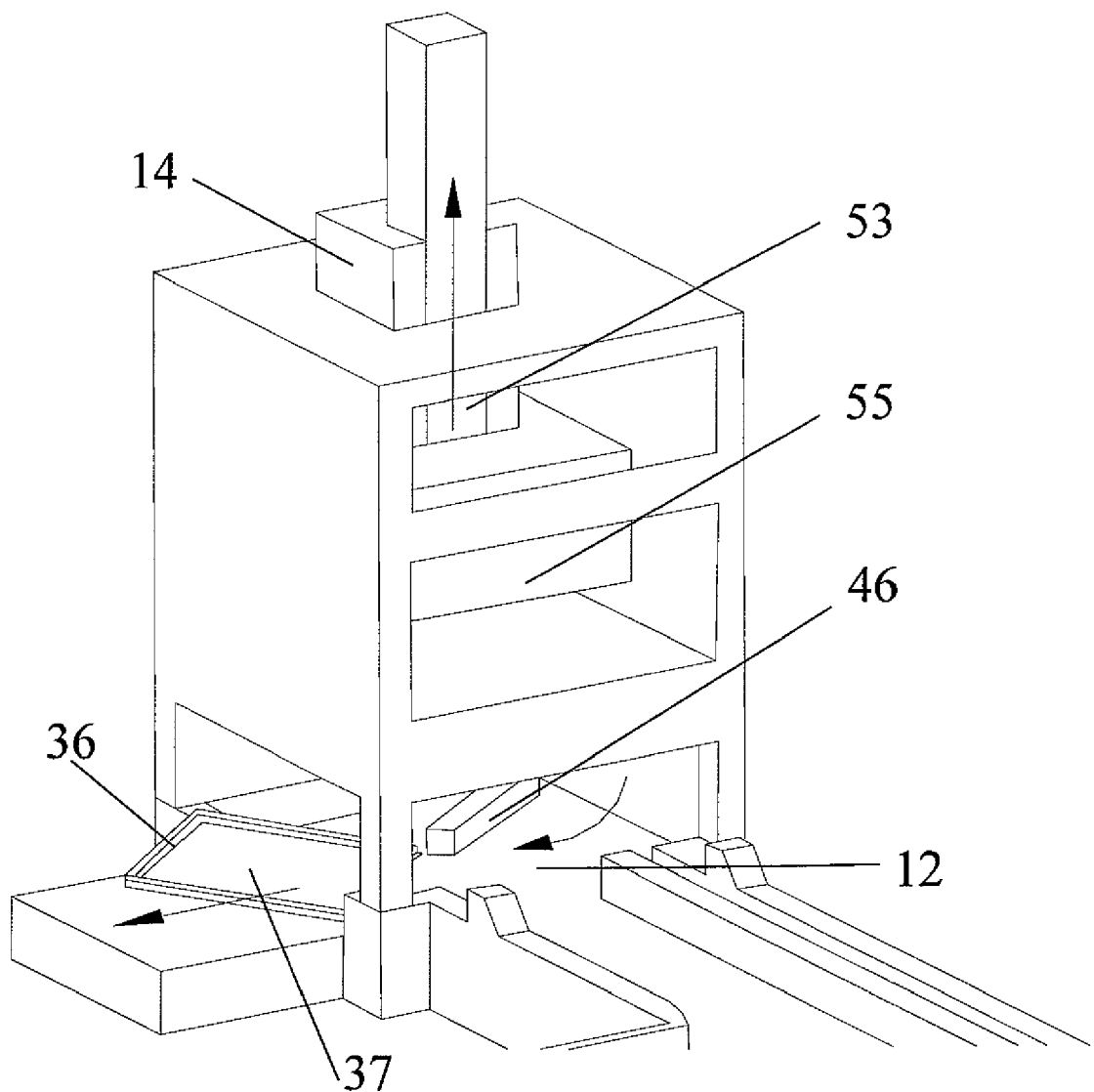

Referring to FIG. 10, in step 70 of "inletting covers (or frames)," when the second apparatus 33 transports frames 36 or covers 37 and contacts with metal conductive sensor 61, the first driving module 58 and the second driving module 59 will be enabled. Then, in step 71 of "inletting frames (or cover)," when the first driving module 58 is enabled, the first transporting apparatus 32 starts to transport frames 36 or covers 37 into slide path 11. Then, in step 72 of "driving frames (or covers)," the first driving module 58 drives block 22 to push frames 36 or covers 37 onto slide path 11. On the other hand, the first driving module 58 slides from the top to the bottom of the slide path 11, and can moves backward and forward. Afterwards, in step 73 of "driving covers (or frames)," when the second driving module 59 is enabled, the second driving module 59 drives the driving sticker 60 to rotate the frames 36 and covers 38 transported by the second transporting apparatus 33 by 90 degrees and push the frames 36 and covers 38 to track 18, and enable power assembling module 14. And, in step 74 of "arriving position 1 (first stop line)," the frames 36 (or covers 37) are pushed by the first driving module 58 and the covers 37 (or frames 36) are pushed by the second driving module 59 to the position 1 of the first stop line 64 on the right of the assemble area 12, as shown in FIG. 6. And then, in step 75 of "combining the frames and covers at first," frames 36 and covers 37 are approximately combined. Then, in step 76 of "driving the combination of frames and covers," the device will approximately combine the frames 36 and covers 37 with each other. Afterwards, in step 77 of "arriving the position 2 (second stop line)," the second driving module 59 employs the driving shaft 60 to push these approximately combined frames 36 and covers 37 to the position 2 of the stop line 65 on the left of the assemble area 12, as shown in FIG. 6. Then, the first driving module 58 and the second driving module 59 move back to the original position. On the other hand, the driving shaft 60 of the second driving module 59 are moving forward and backward between the second transporting belt 33, track 18 and assemble area 12.

Subsequently, in step 78 of "assembling the approximate combined frames and covers," when the photo interrupters sensor 62 in track 18 enables power assemble module 14, using the third rack 53 to drive the pressing cubic mold 55 to press downwardly and vertically the frames 36 and covers 37 in assembling section 12, to assemble the combination of frames 36 and covers 37, after the pressing cubic mold 55 moves back to the original position. On the other hand, the pressing cubic mold 55 connected by the power assemble module 14 presses downwardly and vertically to the assembling section 12 and can move forward and backward. Then, in step 79 of "stirring into collecting plate with stirring sticker," the switch sensor 63 in assemble area 12 enable the stirring sticker 46 to stir the combination of frames 36 and covers 37 into collecting plate 38. Finally, in step 80 of "collecting the combination of frames and covers," the stirring sticker 46 helps to collect the combination of frames 36 and covers 37 effectively, and then the stirring sticker 46 moves back to the original position. When the pressing cubic mold 55 moves back to the original position, the photo interrupter sensor 62 in power assemble system 14 enables metal conductive sensor 61, to re-assemble frames 36 and covers 37, and provides an auto-assemble effect.

The advantages of auto-assembling system 10 according to the present invention are as follows: (1) aligning one degree of freedom along one direction at a time to simplify the complexity of the system structure; (2) the adjustable handrails are suitable for every kind of frames and covers to enhance the applicability; (3) mechanically adjusting the error of position to reduce the high cost of high precision equipment; (4) parallel connecting multiple auto-assemble machines to increase productivity and efficiency; (5) control by single-chip and control circuit in place of an expensive controlling system, to reduce the cost of production, and maintenance.

Although specific embodiments have been illustrated and described, it will be obvious to those skilled in the art that various modifications may be made without departing from what is intended to be limited solely by the appended claims.

What is claimed is:

1. An auto-assembling system, comprising:
a first transportation apparatus having a first transportation belt and having a slide way connected to an end of said transportation belt for transporting a first item;
a second transportation apparatus having a second transportation belt connected to a track for transporting a second item, wherein said first transportation apparatus is positioned on said second transportation apparatus, and a tilt angle exists between said slide way and said track;
a first driving module connected to and positioned on said first transportation apparatus for driving said first item along said slide way to an assembling section, wherein said first driving module has a motor, a rack positioned on said slide way and a gear connects said motor and said rack, whereby said first driving module moves reciprocally along said slide way;
a second driving module connected to and positioned on said second transportation apparatus for driving said second item transported by the second transportation apparatus along said track to an assembling section, wherein said second driving module has a motor, a driving stick placed on said track and a gear connected to said motor and said driving stick, whereby said driving stick moves reciprocally along said track;
a power assembling module including a motor, a gear connected to said motor, a rack connected to said gear, wherein said rack is connected to a pressing cubic mold, whereby said pressing cubic mold is capable of exerting pressure on said first item vertically and downwardly for combining said first item and said second item, and wherein said power assembling module is positioned besides an end of said first transportation component that said first item is transported to; and
a control circuit connected to said first transportation apparatus said second transportation apparatus, said first driving module, said second driving module and said power assembling module for driving them.

2. The system in claim 1, further comprising a power source connected to said control circuit.

3. The system in claim 1, wherein said power assembling module further comprises a decelerated apparatus connected to said motor and said gear, and a joint connected to said rack and said pressing cubic mold.

4. The system in claim 1, wherein said slide way and said track each include a left handrail, a right handrail, and an inside handrail respectively, and wherein each said inside handrail is positioned between its respective left handrail and right handrail.

5. The system in claim 4, wherein each said inside handrail is connected to its respective left handrail by a spiral shaft, a spring and a nut.

6. The system in claim 4, further comprising a horizontal shaft positioned beside an inner side of said right handrail of said slide way.

7. The system in claim 4, further comprising a rack positioned in said left handrail and said right handrail of said slide way.

8. The system in claim 1, further comprising a stirring shaft located in said assembling section.

9. The system in claim 1, further comprising a soft pad located inside said assembling section.

10. The system in claim 1, further comprising plural sensors disposed on said slide way and said track for sensing the position of said first item and said second item respectively.

11. The system in claim 1, further comprising a collecting plate positioned beside said assembling section for collecting the combination of said frame and said cover.

12. An auto-assembling system, comprising:
a track with a left handrail, a right handrail and a inside handrail wherein said inside handrail is positioned between said right handrail and said left handrail;
a slide way with a left handrail, a right handrail and a inside handrail, wherein said inside handrail is positioned between said right handrail and said left handrail and said slide way positioned on said track and a tilt angle exists between said slide way and said track;
a first transportation apparatus including a first transportation belt for transporting a first item to said slide way;
a second transportation apparatus including a second transportation belt for transporting a second item to said track, wherein said first transportation apparatus is positioned on said second transportation apparatus, wherein said second driving module has a motor, a driving stick placed on said track and a gear connected to said motor and said driving stick, whereby said driving stick moves reciprocally along said track;

a first driving module connected to and positioned on said first transportation apparatus for driving first item along said slide way to said track, wherein said first driving module has a motor, a rack positioned on said slide way and a gear connects said motor and said rack, whereby said first driving module moves reciprocally along said slide way;

a second driving module connected to and positioned on said second transportation apparatus for driving said second item transported by the second transportation apparatus to an assembling section through said track, wherein said first transportation apparatus is mounted on said second transportation apparatus;

a power assembling module includes a motor, a gear connected to said motor, and a rack connected to said gear, wherein said rack is connected to a pressing cubic mold, whereby said pressing cubic mold is capable of exerting pressure on said first item vertically and downwardly for combining said first item and said second item, and wherein said power assembling module positioned besides an end of said first transportation component that said first item is transported to; and a control circuit connects the first transportation apparatus, said second transportation apparatus, said first driving module, said second driving module and power assembling module for driving them.

13. The system in claim 12, further comprising a power source connected to said control circuit.

14. The system in claim 12, further comprising a decelerated apparatus connected so said motor and said gear, and a joint connected to said rack and said pressing cubic mold.

15. The system in claim 12, wherein each said inside handrail is connected to its respective said left handrail by a spiral shaft, a spring and a nut.

16. The system in claim 12, further comprising a horizontal shaft, positioned besides an inner side of said right handrail of said slide way.

17. The system in claim 12, further comprising a rack positioned in said left handrail and said right handrail of said slide way.

18. The system in claim 12, further comprising a stirring shaft located in said assembling section.

19. The system in claim 12, further comprising a soft pad located inside said assembling section.

20. The system in claim 12, further comprising plural sensors disposed on said slide way and said track.

21. The system in claim 12, further comprising a collecting plate positioned beside said assembling section for collecting the combination of said first item and said second item.

* * * * *